United States Patent
Sakarda (10) Patent No.: US 6,189,050 B1
(45) Date of Patent: Feb. 13, 2001

(54) METHOD AND APPARATUS FOR ADDING OR REMOVING DEVICES FROM A COMPUTER SYSTEM WITHOUT RESTARTING

(75) Inventor: Premanand Sakarda, Acton, MA (US)

(73) Assignee: Compaq Computer Corporation, Houston, TX (US)

( * ) Notice: Under 35 U.S.C. 154(b), the term of this patent shall be extended for 0 days.

(21) Appl. No.: 09/074,767

(22) Filed: May 8, 1998

(51) Int. Cl.[7] .............................. G06F 15/40; G06F 13/22; G06F 13/00; G06F 9/445; G06F 15/02
(52) U.S. Cl. ........................... 710/18; 710/103; 710/104; 710/10; 710/15; 710/17; 710/19; 709/301; 709/226; 709/220; 709/300; 713/1; 713/323; 711/115
(58) Field of Search ................................. 710/8, 10, 18, 710/103, 15; 709/100, 301, 220, 226; 395/712; 711/115

(56) References Cited

U.S. PATENT DOCUMENTS

| | | | |
|---|---|---|---|
| 5,319,751 | * | 6/1994 | Garney .................................. 711/115 |
| 5,404,494 | * | 4/1995 | Garney .................................. 709/300 |
| 5,412,798 | * | 5/1995 | Garney ....................................... 713/1 |
| 5,630,076 | * | 5/1997 | Saulpaugh et al. .................... 710/10 |
| 5,655,148 | * | 8/1997 | Richman et al. ....................... 710/18 |
| 5,748,980 | * | 5/1998 | Lipe et al. .............................. 710/18 |
| 5,781,798 | * | 7/1998 | Beatty et al. ........................... 710/10 |
| 5,787,246 | * | 7/1998 | Lichtman et al. .................... 709/220 |
| 5,793,979 | * | 8/1998 | Lichtman et al. .................... 709/226 |
| 5,793,987 | * | 8/1998 | Quackenbush et al. ............. 710/100 |
| 5,802,365 | * | 9/1998 | Kathail et al. ........................ 709/301 |
| 5,809,329 | * | 9/1998 | Lichtman et al. ...................... 710/18 |
| 5,819,107 | * | 10/1998 | Lichtman et al. ..................... 710/18 |
| 5,889,965 | * | 3/1999 | Wallach et al. ....................... 710/103 |
| 5,892,928 | * | 4/1999 | Wallach et al. ....................... 710/103 |
| 5,978,923 | * | 11/1999 | Kou ....................................... 713/323 |
| 6,023,585 | * | 2/2000 | Perlman et al. ....................... 395/712 |
| 6,081,850 | * | 6/2000 | Garney ................................... 710/15 |

OTHER PUBLICATIONS

Ioannidis et al. "Porting AIX Onto the Student Electronic Notebook", Proceedings of the 1991 ACM SIGSMALL/PC Symposium on Small Systems, 1991, pp. 76–82.*

Banna et al. "Fully Depleted CMOS/SOI Device Design Guidelines for Low–Power Applications", Electron Devices, IEEE Transactions on, vo. 46 Issue: Apr. 4, 1999, pp. 754–761.*

* cited by examiner

Primary Examiner—Thomas C. Lee
Assistant Examiner—Katharina Schuster
(74) Attorney, Agent, or Firm—Hamilton, Brook, Smith & Reynolds, P.C.

(57) ABSTRACT

A method and apparatus provide a mechanism for a personal computer to allow the insertion and removal of devices to and from device ports without re-starting the operating system of the computer. Device drivers are pre-loaded during the start-up process of the computer system for devices that may be inserted in the system later. Upon detection of device insertion, a high priority thread process determines the type of device inserted and determines which pre-loaded device driver can operate the newly inserted device. The selected device driver is linked to the file system and is activated by signaling to the device driver or to the operating system of the existence of the newly inserted device. The operating system can then operate the inserted device. Upon device removal, device drivers for the removed device can be deactivated. The system also allows a docking station to have devices added or removed from device ports after the docking process has been completed.

20 Claims, 6 Drawing Sheets

METHOD AND APPARATUS FOR ADDING OR REMOVING DEVICES FROM A COMPUTER SYSTEM WITHOUT RESTARTING

BACKGROUND OF THE INVENTION

Many computer systems such as personal computers are based on the Intel 80×86 or Pentium series of microprocessors, or another compatible microprocessor, and are controlled by Microsoft Corporation's Windows 95 (TM), Windows 98 (TM), or Windows NT (TM) operating system software. In such systems, additional peripheral devices such as hard disk drives, CD-ROM drives, printers, modems, memory modules, and so forth are often added and removed by the user.

For example, an extra hard disk may be added to increase storage capacity. The addition of the hard disk is typically performed by powering-off the computer and inserting the extra hard disk into a port designed to accept such a device. The port connects to a bus linking the device to other components in the system. When the system is subsequently powered-on, as the operating system starts up or "reboots", the new hard disk device is detected on the bus and the operating system configures itself and the new device for proper operation with one another and application programs. To remove the hard disk, typically, the power is turned-off and the device is removed from the port. When the operating system subsequently reboots, no configuration for the device takes place due to the absence (i.e., removal) of the device on the bus.

During device configuration in both the Windows 95 and Windows NT (TM) operating systems, the system enumerates each device detected on each bus at system start-up. The enumeration process assigns a unique address or number to each device in order to properly access that device. The system also loads device driver software into memory for each device detected, if a driver is not already present. Device drivers provide the required instructions for proper device operation with the operating system and the applications which access the device.

While typical device installation and removal in personal computer systems is performed with the power turned off, certain computer configurations, such as laptop personal computers, provide the option of coupling the laptop portion (i.e., the main computer) to a docking station. In such scenarios, a fully operational (i.e., fully booted) laptop computer may be inserted or "docked" with a docking station. The docking station includes a separate internal bus and bus controller and may contain one or more devices inserted into device ports on the bus within the docking station.

Upon docking, a powered-up computer operating under the Windows 95 (TM) operating system (but not under the Windows NT (TM) operating system) will recognize a new bus controller and its associated bus and will re-enumerate all devices that are inserted into ports on the new bus in the docking station, but only if the device is present (i.e., is inserted in a port) at the time when the powered-up computer is docked with the docking station. For instance, if an operational laptop is docked with a docking station containing a bus controller device, an inserted floppy disk device and an inserted hard disk device, the Windows 95 (TM) operating system will correctly detect and configure the additional bus controller device, as well as the inserted floppy and hard disk devices, even though the power to the laptop was not reset and the laptop was not re-started. The Windows 95 (TM) operating system will correctly enumerate and load device drivers, if necessary, for each device that is present on the newly added bus and will allow the devices to subsequently operate.

However, once this docking configuration process is complete, any additional devices subsequently inserted into empty ports on the bus in the docking station or into ports on the bus in the main computer itself will not be renumerated and will not have device drivers loaded. The only exception to this is if a new device is attached via another new bus controller that may include another additional bus and/or devices. Essentially, non-bus controller devices such as disk drives, CD-ROM's and so forth that are inserted after start-up of the main computer, or after docking, will be inaccessible by applications and the operating system. To add devices to a Windows 95 operating system after the boot process is complete, the new devices can only be inserted via adding a new bus controller and a new bus at the time of docking.

The Windows 95 (TM) operating system allows device configuration for new devices on a newly added bus only when the new bus is coupled to the system with a separate bus controller device. When a new bus controller device is present, the Windows 95 (TM) operating system can be assured that only a new bus is being added and that reconfiguration of devices on this new bus will not conflict with any currently configured device(s) on another bus. The Windows 95 (TM) operating system does not allow the configuration of a new device on an existing bus of devices due to the potential conflict that may arise between the new device(s) and any existing configured device(s).

The Windows NT (TM) operating system contains no mechanism for renumerating or configuring devices added after boot time, whether in a docking station configuration using a separate new bus and bus controller or not.

SUMMARY OF THE INVENTION

The present invention overcomes the aforementioned limitations of the Windows 95 and Windows NT operating systems. Using the present invention, a new device may be added or removed to or from an existing configured bus in a computer running either of the Windows operating systems, after the system is started-up. The invention allows the computer system to correctly configure itself, the bus for operation with the newly added or removed device.

For instance, after a computer has been started-up and is running applications (i.e., is fully operational), a user may encounter a need to access software stored on a CD-ROM when no CD-ROM drive device is installed on the computer system. Using the invention, the user can insert a CD-ROM drive into an unused device port on the computer and the invention will ensure that the operating system is properly configured to operate the newly inserted CD-ROM drive, without the need to shutdown and reboot the machine.

Specifically, the present invention provides a method and an apparatus for accessing a device inserted into a port of a bus of a computer system after start-up of the computer system, even when no new bus controller is added contemporaneously. In the method of the invention, device driver(s) for device(s) that are not presently connected to buses are pre-loaded. Then, insertion of a device into the port is detected, and the type of device inserted into the port is detected. With this information, a device driver associated with the type of device is activated to enable to operating system to access the device.

Another embodiment of the invention provides an operating system for a computer system. The operating system includes a common data structure that stores data associated with at least one device. A device driver loading process is included that loads and enumerates at least one device driver into the data structure portion during start-up of the computer system. This pre-load operation is performed for drivers that are not active immediately after boot-up, but that may be activated later when new devices requiring these drivers are inserted and detected in the system.

In the operating system, a thread process executes after start-up of the computer system and monitors for state transitions of devices into the computer system. Upon insertion detection, the thread process activates the loaded device driver for the inserted device. Upon detection of device removal, the thread process de-activates the loaded device driver for the removed device. In this manner, the operating system can accommodate devices inserted or removed at any time after system start-up.

By pre-loading device driver(s) and providing a thread process to monitor device insertion and removal, the invention avoids device enumeration problems associated with the prior art operating systems when non bus controllers are added with the device(s), since device drivers are pre-loaded and can be activated and de-activated depending upon which devices are presently inserted into device ports on any buses in the system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
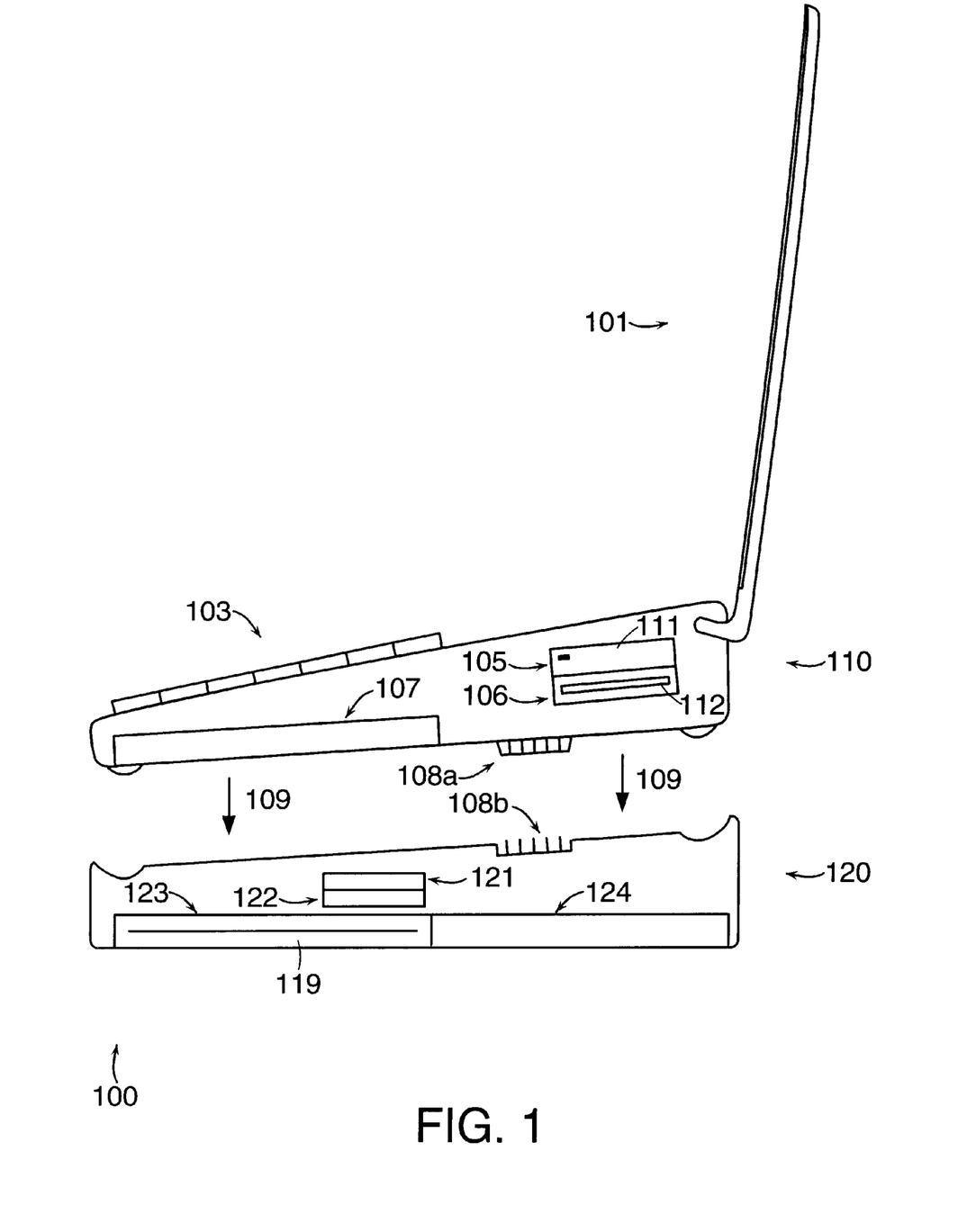
FIG. 1 illustrates an exemplary computer system and docking station in which the present invention may operate.

FIG. 1 illustrates a typical computer system 100 which may be configured according to the present invention. Computer system 100 includes a laptop computer 110 having a keyboard 103 for entering data, a monitor 101 for displaying data and information, device ports 105, 106 and 107 for interfacing the computer 110 to various bus devices, and docking port 108-a. The laptop computer 110 is preferably a personal computer, based on an Intel 80×86, Pentium, or Pentium II or other compatible microprocessor manufactured by Intel Corporation or another manufacturer.

While not required for the invention, computer system 100 is also illustrated with a docking station 120, which includes docking port 108-b and device ports 121 through 124 for accommodating additional bus devices which can interoperate with the laptop computer 110. Laptop computer 110 is coupled or "docked" to docking station 120 by lowering the laptop computer 110 onto docking station 120 in the direction of arrows 109. When docked, docking interfaces 108-a and 108-b interconnect forming a data interface between at least one bus in the laptop computer 110 and separate bus(es) (not shown in FIG. 1) within the docking station 120.

An example of laptop computer 110 is the HiNote Ultra 2000 Laptop Computer, manufactured by Digital Equipment Corporation, the assignee of this invention. An example of docking station 120 is the Multimedia Dock, also manufactured by Digital Equipment Corporation. The invention is not limited to implementation in a laptop computer and docking station configuration, but rather, is applicable to all types "personal computer systems" including desktop and floor standing system, all of which are often referred to as "IBM Compatible" personal computers.

Ports 105, 106 and 107 in the laptop computer 110, and ports 121 through 124 in docking station 120 each contain an interface allowing quick and easy installation or removal of a device such as a hard or floppy disk drive, a CD-ROM device, a memory card, a modem, and so forth, to and from computer system 100. Ports 105, 106 and 107 couple to a data bus within laptop computer 110, and ports 121 through 124 couple to an extension of the laptop's bus or a separate data bus within docking station 120.

As illustrated, the laptop computer 110 contains hard disk drive 111 installed in device port 105 and floppy disk drive 112 installed in devices port 106. The device port 107 is empty or unused in this figure. The docking station 120 only has a single device installed; a CD-ROM drive 119 inserted in device port 123, while the device ports 121, 122 and 124 remain empty.

The hard disk drive 111 stores the operating system and associated application programs that execute on computer system 100. The operating system associated with this invention is preferably Microsoft Corporation's Windows 95 (TM), Windows 98 (TM), or Windows NT (TM) operating system software. It is to be understood that this invention may also be applied to future releases or compatible or related versions of the Windows (TM) operating system software.

Using the invention, insertion or removal of devices to or from device ports 105 through 107 may be performed after the computer system 100 has been started-up and is running applications. If the user docks the laptop computer 110 with docking station 120 including an embodiment of this invention, the Windows (TM) operating system will detect the presence of a new bus controller device and will reconfigure the laptop computer 110 to allow access to any device(s) (i.e., disk drives, etc.) currently installed in the docking station 120 at the time of docking. The invention further allows future insertion or removal of devices to and from device ports 121 through 124 in the docking station 120, without requiring the laptop computer 110 to power down and re-start.

Figure 2:
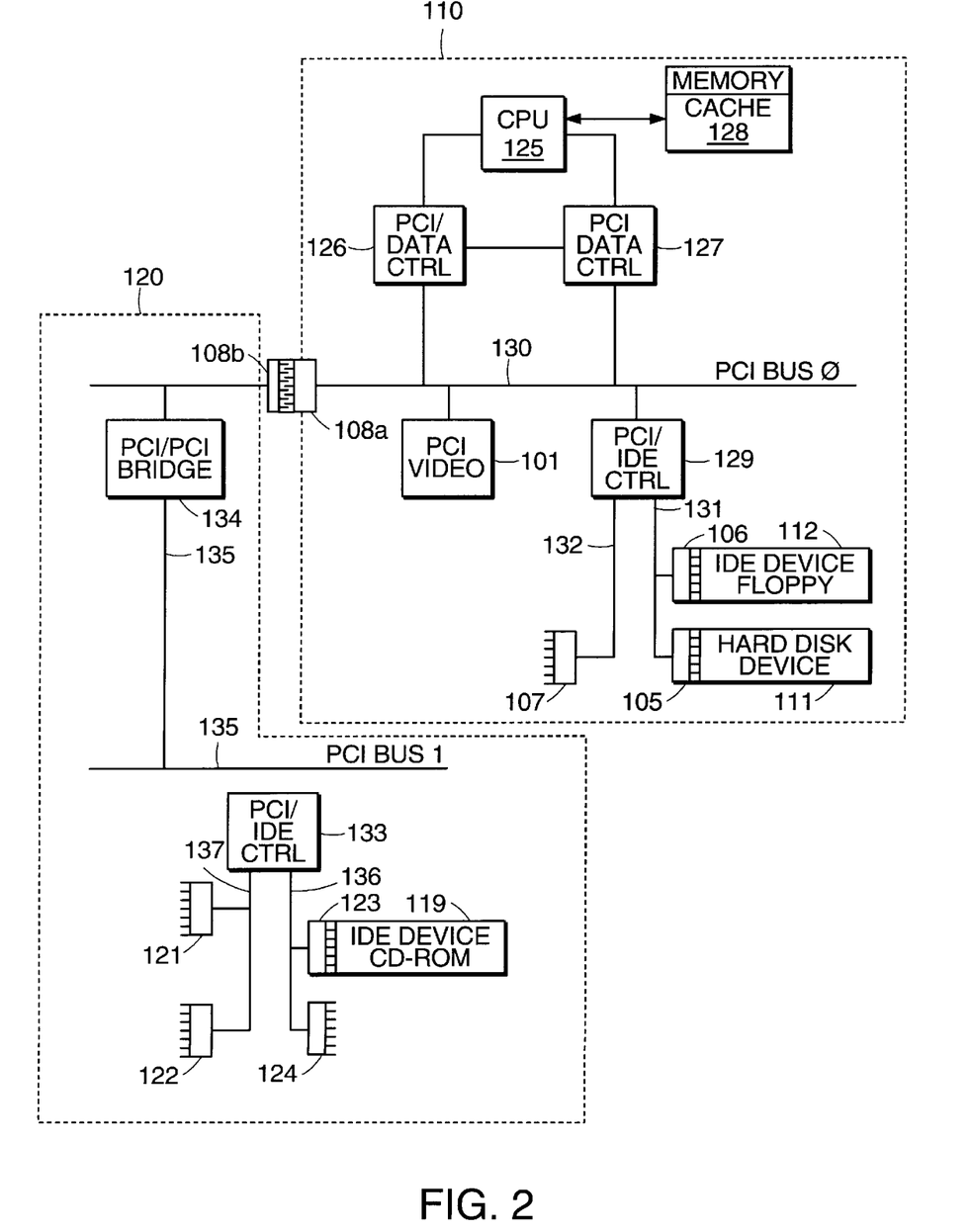
FIG. 2 is a block diagram of an exemplary bus architecture for a docked computer system to which the present invention may be applied.

FIG. 2 illustrates the internal bus configuration corresponding to the laptop computer 110 when docked with docking station 120. Laptop computer 110 contains central processing unit (CPU) 125 which is one of the Intel or compatible microprocessors noted previously. Bus controllers 126 and 127 allow the CPU 125 to control and arbitrate data transfers over bus 130, which, in this example is a standard Peripheral Component Interface (PCI) bus labeled PCI BUS 0. The data is transferred between the CPU 125, memory/cache 128, and any devices that may be installed in device ports 105, 106 and 107, or devices ports 121 through 124 on docking station 120.

In this example, hard disk device 111 and floppy disk device 112 connect, respectively, to device ports 105 and 106, which couple to at least one bus. For example, hard disk 111 couples through device port 105 to primary Intelligent Device Enabler (IDE) bus 131. Unused device port 107 is coupled to a secondary IDE bus 132. Any devices installed on primary and secondary IDE buses 131 and 132 are separately controlled by a PCI/IDE bus controller 129, which is considered a device itself by the PCI bus controller 127. The PCI/IDE bus controller 129 coordinates device control and data transfer between the IDE busses 131 and 132 and the PCI bus 130. Certain devices, such as the PCI video card 101, may not require separate bus controllers and can be directly coupled to PCI bus 130.

Docking station interface 108-a is coupled (i.e., docked) with interface 108-b and allows the PCI bus 130 in the laptop computer 110 to be extended with the PCI bus 135 (PCI BUS 1) in the docking station 120, via the PCI/PCI bridge device 134. Each device port 121 through 124 in the docking station 120 couples any inserted device with either a primary or secondary IDE bus 136 or 137, each of which are linked to the docking station's PCI bus 135 via another PCI/IDE controller 133.

Figure 3:
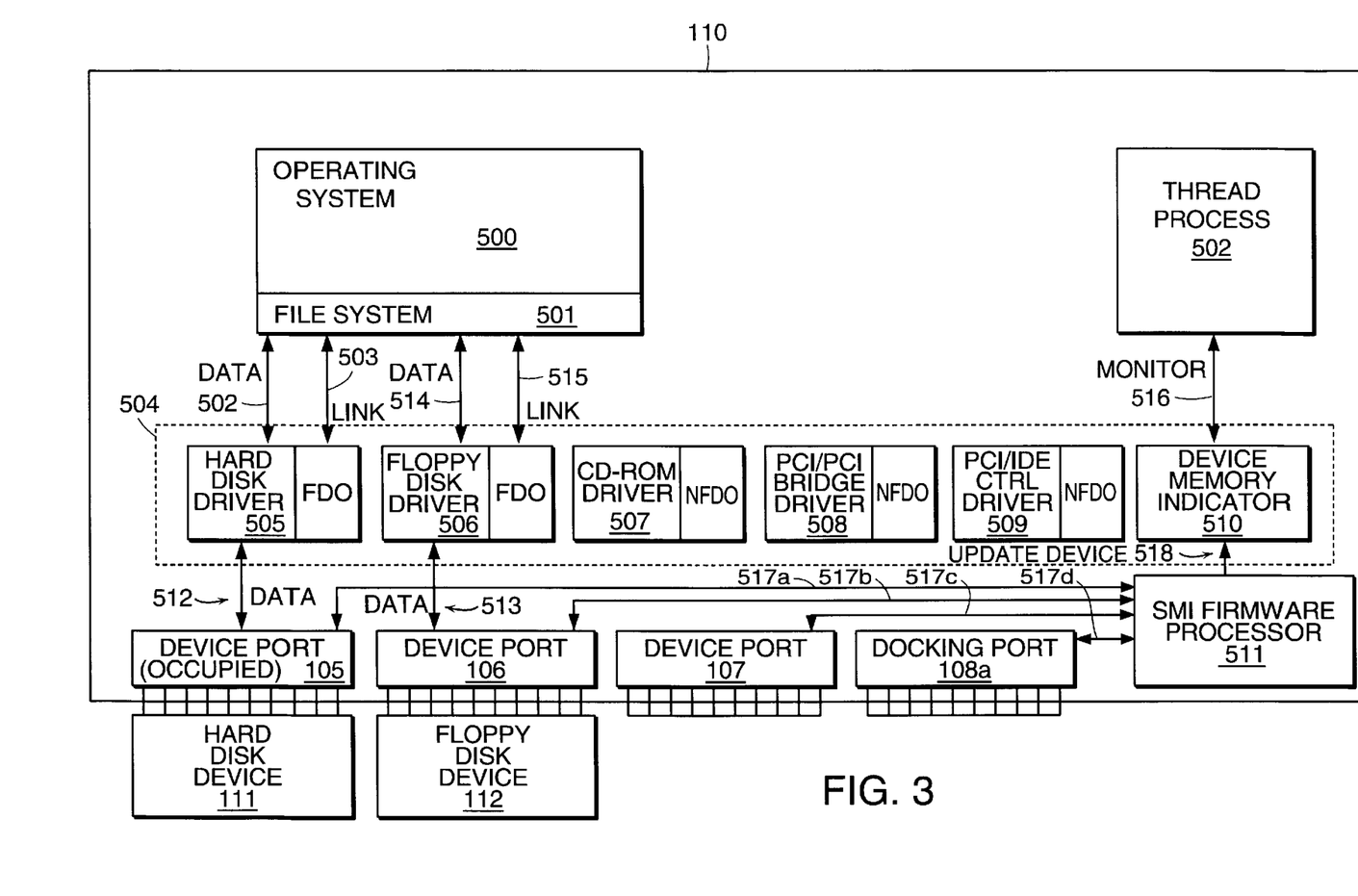
FIG. 3 is a schematic block diagram illustrating the relationship between certain hardware and software processing components of a computer system configured according to this invention.

FIG. 3 illustrates the relationship between hardware and software portions of computer 110 configured according to this invention. The hardware components include device driver memory 504, device ports 105 through 107 and docking port 108-a, System Management Interrupt (SMI) firmware processor 511 (e.g., BIOS firmware) and the inserted hard and floppy disk devices 111 and 112. The software components that interact with the various hardware components are the operating system 500 including file system 501, device drivers 505 through 509 loaded into device driver memory 504, and thread process 502. The hardware and software components of FIG. 3 enable the computer 110 to detect and configure devices that are installed after the start-up of computer 110.

Figure 4:
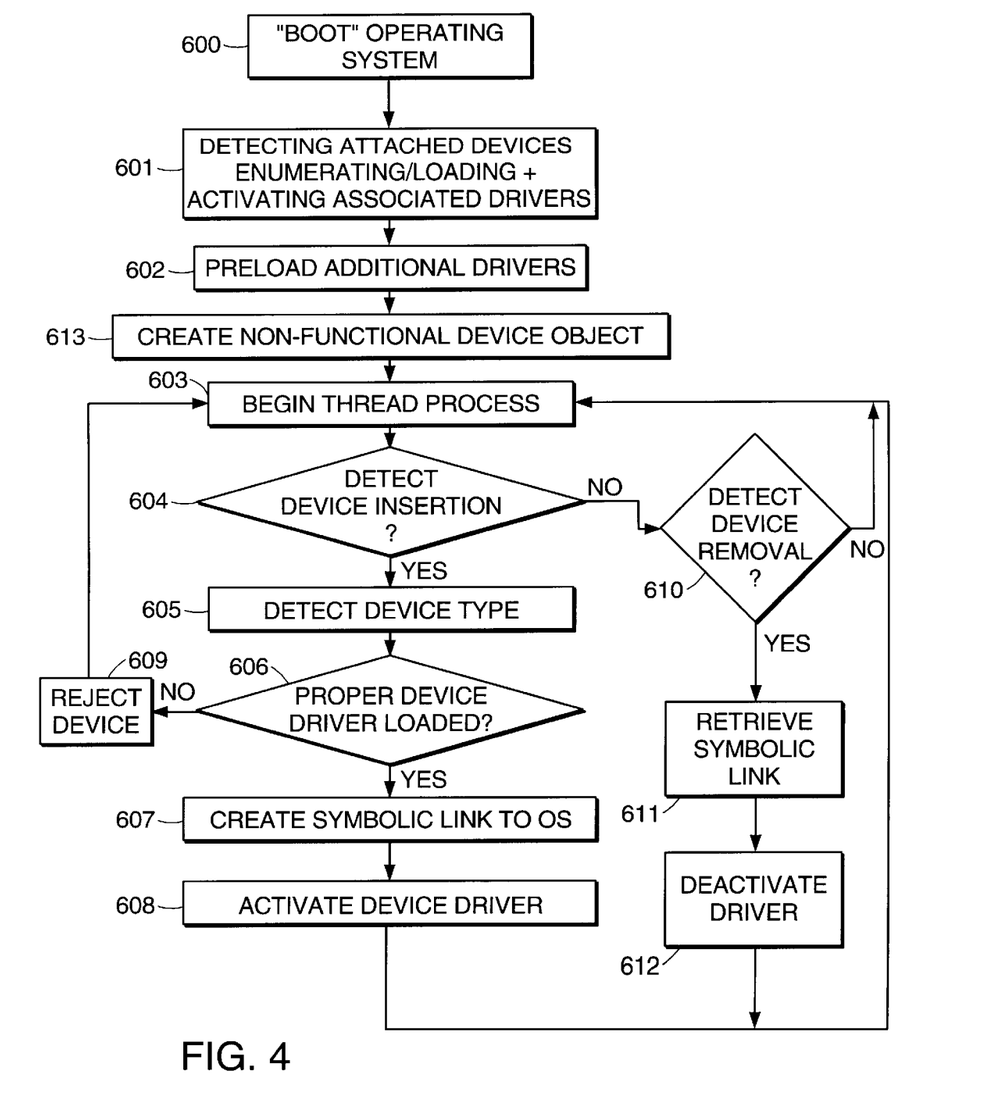
FIG. 4 is a flow chart of the general processing procedures used in a computer system configured according to this invention.

Steps 601 through 615 in FIG. 4 illustrate the general processing strategy employed by an embodiment of the invention to enable a computer to operate a device installed onto or removed from a bus after system start-up. In step 600, after power is applied, the computer 110 begins to automatically load the Windows (TM) operating system 500 from a default storage location on the hard disk 111. After the operating system is loaded and begins to execute, configuration of the computer 110 commences. In step 601, the operating system 500 detects and enumerates all currently attached devices on all buses and loads and activates a device driver in device driver memory 504 for each detected device.

Device enumeration comprises assigning a unique address to each individual device detected on a bus and reserving resources for the usage of that device, such as a memory window, an interrupt, and an I/O window. In FIG. 3, devices 111 and 112 on PCI bus 130 are enumerated in this manner. Once all the devices have been enumerated, step 601 also loads device drivers 505 and 506 for the devices 111 and 112, respectively. The device driver software that gets loaded is also obtained from a default location on the hard disk 111. To allow the operating system 500 to operate the devices 111 and 112 via their respective device drivers 505 and 506, step 601 creates symbolic links 503 and 515 from the device drivers 505 and 506 to the file system 501 of the operating system 500. Step 601 then activates the devices 111 and 112 by signaling to the operating system 500 that the devices have been configured. The symbolic links 503 and 515 cause each device to appear as a device to the file system and allow each device driver 505 and 506 to act as a functional device object (FDO), as indicated by the letters "FDO" within the device drivers 505 and 506 in FIG. 3.

In this invention, a functional device object is essentially an activated device driver that resides in device driver memory 504 and "appears" in the file system 501. Additionally, device objects are used to communicate between different parts of the operating system, such as the file system 501, in reference to that device. After the creation of a symbolic link from the device driver in memory 504 to a location within the file system 501 a device driver is activated by signaling to the operating system 500 that the device is now ready for operation. The symbolic link also provides an access point for the device and allows data to pass between an application running on the operating system 500 and the actual device which the activated driver controls. For example, in FIG. 3, data 502 and 514 passes to and from the operating system 500 and device drivers 505 and 506 via symbolic links 503 and 515, respectively. Device drivers 505 and 506 in turn pass data 512 and 513 to and from the respective devices 111 and 112 which the device drivers 505 and 506 respectively control.

Step 602 in FIG. 4 then pre-loads additional device drivers from a storage location on hard disk 111 into device driver memory 504 and step 613 creates non-functional device objects for these pre-loaded drivers by, for example, reserving a memory window, an interrupt, and an I/O window for the device driver to use when operational. Device drivers are pre-loaded in order for the computer 110 to accommodate devices that may later be inserted into unused device ports on computer 110 (e.g., empty device port 107) or that may be swapped with a currently existing device (e.g., device port 106 containing floppy disk device 112). The number and type of additional pre-loaded device drivers may be configured by a user, for instance, when configuring and installing the operating system 500.

The invention allows pre-loading (step 602) of many different types of device drivers for devices which may be added to the system later, such as IDE devices, ATAPI devices, CD-ROM and other multimedia devices such as DVD drives, LS-120 drives and ZIP drives. During the start-up process, if a device does not exist on a bus (i.e., is not inserted in any device port) for a device driver that has been pre-loaded, the device driver is not linked to the operating system and is not activated. However, pre-loaded device drivers remain resident but inactive in device driver memory 504 in the event that a device is inserted that requires a pre-loaded driver to operate. Step 613, by reserving device driver resources, allows the device driver to be later activated. After step 613, pre-loaded but inactive device drivers are referred to as a non-functional device objects (NFDO).

In the example shown in FIG. 3, non-functional device objects for un-inserted devices, such as CD-ROM driver 507 for a CD-ROM drive device, PCI/PCI bridge driver 508 for a PCI/PCI bridge device, and PCI/IDE control driver 509 for a PCI/IDE controller device are all pre-loaded with reserved resources in device driver memory 504 in steps 602 and 613. These pre-loaded device drivers 507 through 508 are not activated at boot time and do not contain a symbolic link to the operating system 500 since any actual devices which they control are not present on the PCI bus 130 (FIG. 2) when the system is started-up.

After step 613 is complete and the operating system 500 has finished the start-up process, the invention starts a thread process 502 which begins processing at step 603.

In FIG. 3, the thread process is indicated by schematic block 502. Once started, the thread process 502 is a prioritized process that monitors, via monitor interface 516, a device memory indicator 510 for the insertion or removal of devices into or out of device ports on a bus. Device memory indicator 510 is, for example, a CMOS memory location or one or more addresses in device driver memory 504 that indicate the status of each device port 105 through 108-a. These memory locations are periodically polled or continuously monitored by thread process 502 to obtain an indication of device insertion or removal from any device ports on any buses during system runtime.

In a preferred embodiment, device memory indicator 510 is automatically maintained with the proper status of each device port on each bus by System Management Interrupt (SMI) Firmware processor 511, which couples to each device port via port links 517-a through 517-d. During runtime, if a device is inserted or removed from any device port 105 through 108-a, the SMI firmware processor 511 immediately and automatically updates the device memory indicator 510 with the status of the affected device port via update device interface 518.

In terms of thread process 502, step 604 detects whether or not a new device is inserted into a port on a bus. At each iteration of step 604, if no device insertion is detected, processing proceeds to step 610 to detect device removal from a device port. If in step 610, no device removal is detected, processing returns to step 603 to repeat the insertion and removal detection processing (steps 604 or 610) of thread process 502. Device removal can also be detected via monitoring device memory indicator 510 in device driver memory 504, as explained above for device insertion.

Figure 5:
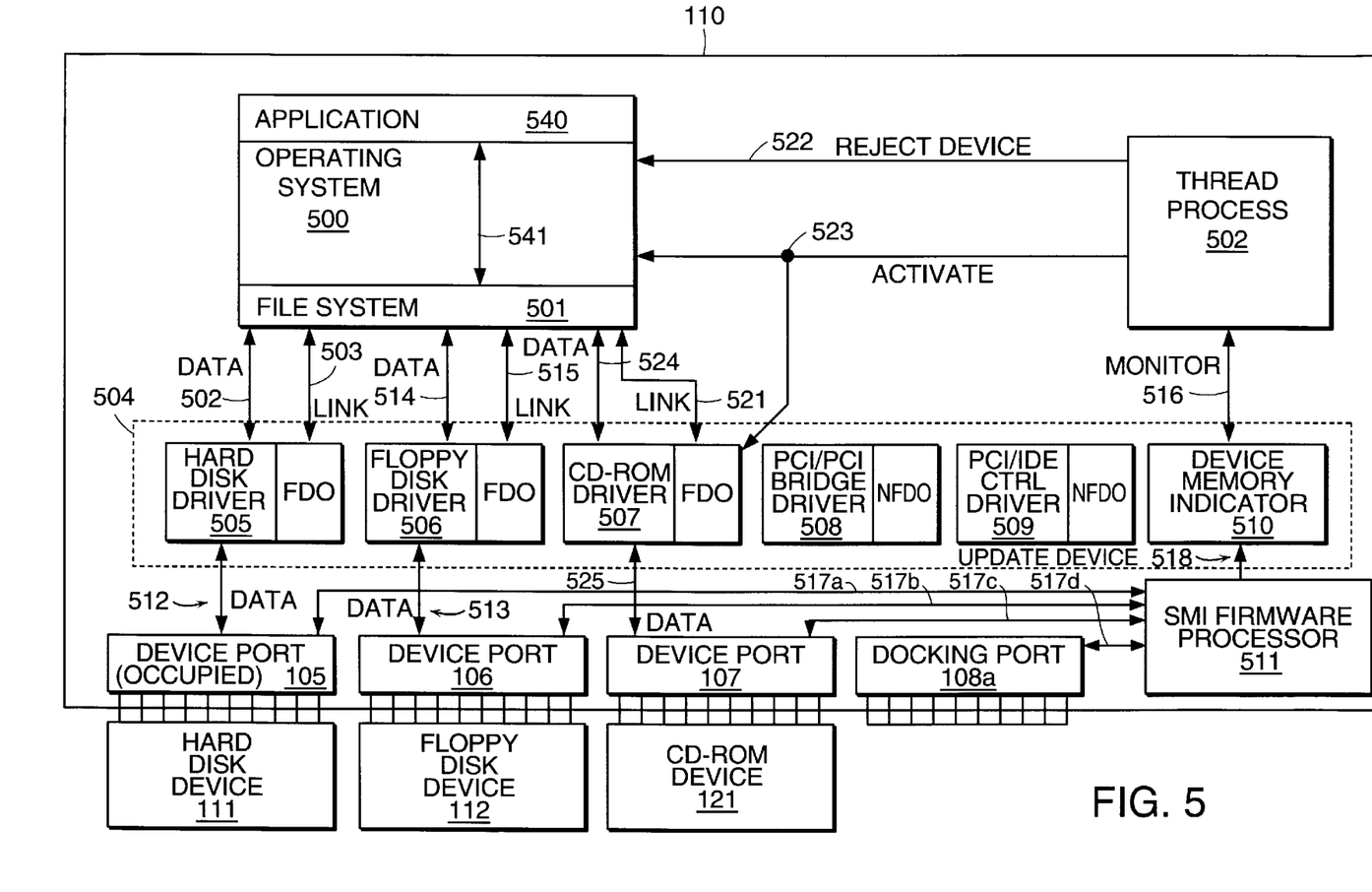
FIG. 5 is a block diagram illustrating the interaction between certain hardware and software components for a device insertion in a computer system configured according to this invention.

FIG. 5 illustrates the system configuration of FIG. 3 when a CD-ROM device 121 is inserted into device port 107 after computer 110 is started-up. In FIG. 5, SMI firmware processor 511 detects, via port link 517-d, that CD-ROM device 121 is inserted into device port 107 and updates device memory indicator 510 via update device interface 518 to indicate the presence of this new device. The processing of step 604 in thread process 502 then detects that a device (i.e., CD-ROM device 121) has been inserted into device port 107.

When step 604 detects that a device has been inserted into an unused device port on a bus, step 605 then determines what type of device was inserted into that port. Device types are, for example, CD-ROM's, scanners, printers, memory modules, modems, and so forth. Device type information is obtained from the device memory indicator 510 in conjunction with the detection of the insertion of the device by the SMI firmware processor 511, as explained above. Step 606 then determines if the proper device driver has been pre-loaded into device driver memory 504, based upon the type of device that has been inserted. In some instances, for devices having similar types, a single pre-loaded driver may be later activated upon detection of device insertion for more than one type of device, if the same resources are used by each device. For example, a single pre-loaded driver for a CD-ROM device may also be used to operate a DVD drive device, since the operational characteristics of these devices may be the same.

In the example illustrated in FIG. 5, after step 604 detects device insertion, step 605 determines that the device inserted into device port 107 is a type of CD-ROM device and step 606 determines that a suitable CD-ROM driver 507 has been pre-loaded in device driver memory 504, so that CD-ROM device 121 may be correctly operated.

If there is no proper device driver pre-loaded for the type of device inserted into the device port (i.e., if CD-ROM device driver 507 was not pre-loaded or is not present in device driver memory 504), then step 609 signals to reject the device and returns to step 603.

Thread process 502 rejects a device via the reject device signal 522 in FIG. 5 which is sent to the operating system 500 and indicates that a device has been improperly inserted into a device port. The operating system then informs application 540 that a device driver is not available for this newly inserted device and that the device should be removed.

However, if step 606 detects that a proper device driver has been installed, step 607 creates a symbolic link from that device driver to the file system 501. In he example shown in FIG. 5, step 607 creates symbolic link 521 from CD-ROM device driver 507 to the file system 501 of operating system 500. The creation of the symbolic link 521 causes the CD-ROM device driver 507 to become a functional device object (FDO) with respect to availability for the operating system and applications which may desire to access the CD-ROM device 121.

Step 608 then activates the pre-loaded device driver so that the newly inserted device can operate with computer 110. Device driver activation in step 608 includes signaling to the device driver itself that the computer 110 has been properly configured to begin operating the newly installed device associated with the activated device driver. Alternatively, step 608 can signal directly to the operating system 500 that the newly inserted device exists and is ready for operation.

In FIG. 5, step 608 is illustrated by the activation signal 523 sent from thread process 502 either to operating system 500, CD-ROM device driver 507, or to both. The activation step 608 allows an application 540 executing on operating system 500 to send and receive information and/or data 541 to and from the CD-ROM device 121. To achieve this, data 524 is sent between the file system 501 and CD-ROM device driver 507, and data 525 is sent between the CD-ROM device driver 507 and CD-ROM device 121. An example of data 524 sent to CD-ROM device driver 507 is an instruction from the operating system 500 to find a specific file on the CD-ROM device 120. The device driver 507 in-turn transmits the data 525, in the form of the filename and a seek instruction to the CD-ROM device 121, and receives data 525 such as a "file found" acknowledgment and blocks of file data from the CD-ROM device 120.

As noted above, the present invention also handles the removal of a device from a device port during system operation. To do so, in the event of a device removal, step 610 of thread process 502 detects that a device has been removed from one of the device ports (i.e., occupied device ports 105 or 106 in FIG. 3, or 105, 106 or 107 in FIG. 5). Step 611 then removes the symbolic link (i.e., either link 503, 515 or 521) between the file system 501 and the device driver for the respectively removed device. Step 612 then deactivates the device driver for the removed device by signaling to the device driver and/or to the operating system that the device is no longer present in the computer 110.

To illustrate an example of device removal during runtime, in FIG. 5, after CD-ROM device 121 has been inserted after start-up and the computer 110 is configured for operation of CD-ROM device 121, as explained above with respect to steps 604 through 608, the invention operates to detect device removal of CD-ROM device 121 (Step 610) and de-configures the computer 110 for operation without the removed CD-ROM device 121 (Steps 611 and 612). Actual physical removal of the CD-ROM device 121 is detected, for example, by SMI firmware processor 511 using port link 517-c. SMI firmware processor 511 then automatically updates device memory indicator 510 with an indication that the CD-ROM device 120 is no longer inserted into device port 107 via update device interface 518. The thread process 502 detects the removed status on the next iteration of step 610 via monitor interface 516, and removes link 521 in step 611, thus causing the CD-ROM device driver 507 to become a non-functional device object (NFDO). Thread process 502 then signals to the operating system 500 via signal 523 to deactivate the device (Step 612). The operating system 500, at that point, provides an indication that the device is no longer accessible to applications (e.g., application 540) requesting access to the removed CD-ROM device 120.

While FIG. 5 illustrates aspects of the invention with respect to insertion and removal of a single device, the invention also allows computer 110 to handle the insertion and removal of many devices on many different ports at the same time or at different times. For example, while CD-ROM device 121 is being inserted as explained above, the invention also detects and handles the removal, for example, of floppy disk device 112. The procedures outlined above are followed for each device whether that device is being inserted or being removed.

Moreover, the invention is applicable to configure computer 110 for the addition of multiple devices on a docking station, such as docking station 120 illustrated in FIG. 1. That is, docking port 108-a is treated by the invention like any other device port that accepts a device for insertion during runtime. The hardware and software illustration of docking station configuration is shown in FIG. 6.

Figure 6:
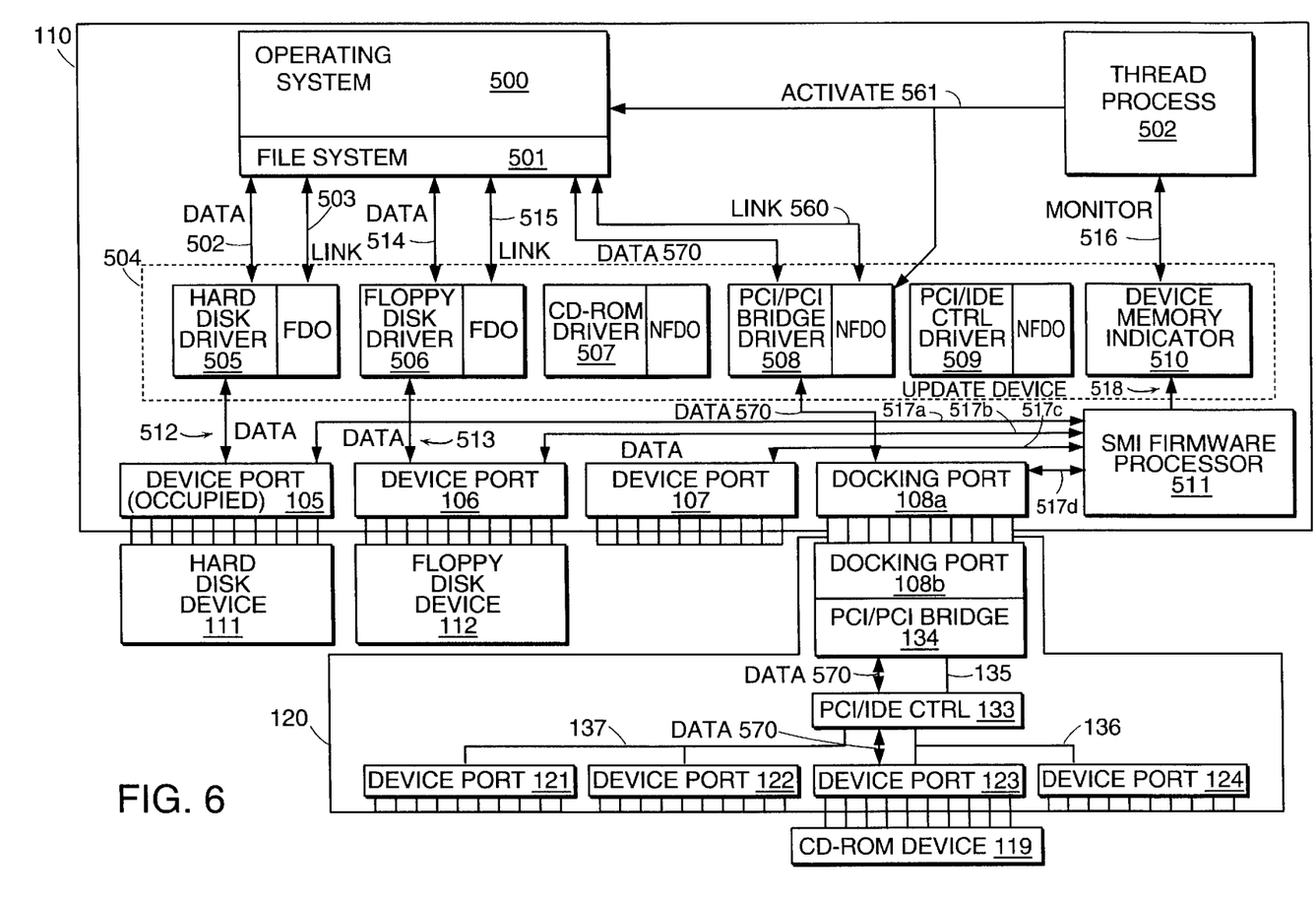
FIG. 6 is a block diagram illustrating the interaction between certain hardware and software components when a computer system configured according to this invention is docked with a docking station.

In FIG. 6, when computer 110 is docked with docking station 120, docking port 108-a interfaces with docking port 108-b. The SMI firmware processor 511 then detects the presence, via port link 517-d, of at least the PCI/PCI bridge device 134 that is present on the additional PCI bus 135 in docking station 120. After the PCI/PCI bridge device 134 is detected (step 604), the device type is determined (step 605) and the proper driver (i.e., the PCI/PCI bridge driver 508) is determined to have been preloaded into device driver memory 504. Thread process 502 then creates a symbolic link 560 from the PCI/PCI bridge driver 508 to a location in the file system 501 of the operating system (step 607), and then activates the PCI/PCI bridge driver 508 via signal 561 to either the driver 508 or the operating system 500. Upon the next iteration of the thread process, any devices that are present on the newly added PCI bus 135, such as CD-ROM device 119, are detected and configured in a similar manner by steps 604 through 608.

Upon docking, docking interfaces 108-a and 108-b also provide an interconnection for SMI firmware processor 511 to detect device insertion and removal within device ports 121 through 124 in docking station 120. Data path 570 represents the data that is transferred to and from CD-ROM device 119 in docking station 120.

If, for example, an additional device such as a second floppy disk device is inserted into an empty device port on docking station 120 after docking is complete, thread process 502 detects and configures this new device and the operating system 500 for operation with each other, just as explained above with respect device insertion in computer 110. Device removal from docking station 120 is also handled in a similar manner as described above for removal of devices from computer 110.

As explained above, the invention provides the ability to add and remove devices at the user's leisure without having to be concerned with re-booting the operating system or re-starting the computer. Since the thread process 502 runs, for example, as a priority process, device detection and configuration or removal and de-configuration are handled quickly and efficiently, without being interrupted by other processes. This allows other processes to run without failure. This also helps to ensure that applications that request access to devices do not do so just prior to the removal of a device.

For instance, in a preferred embodiment, as soon as device removal is detected, the processing of the invention fully completes before other application processing proceeds. In a multitasking system, the invention prevents a situation from developing in which an application requests device access just after removal detection, but just before link removal and deactivation of the device driver for the removed device. The priority of the thread process 502 ensures that steps 610 through 612 are completed without processing breaks for other processes. Thus, an application requesting access to a device that has been removed will be informed of the device removal before being able to further execute, which provides less application errors when trying to access a device.

Alternatively, in real-time systems where applications are the highest priority processes, instead of running the thread process 502 at a higher priority than application processes, a code semaphore system is employed that ensures that once step 610 is executed and returns an indication that a device is removed, steps 611 and 612 are executed before any other instructions in the system. This ensures correct application operation while allowing the thread process 502 to run at a lower priority that application processes.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method for accessing a device inserted into a port of a bus in a computer system after start-up of the computer system, the method comprising the steps of:

pre-loading, during start-up of the computer system, at least one device driver for an un-inserted device for each type of device that can be inserted into the port;

detecting insertion of a device into the port after start-up of the computer system;

detecting the type of device inserted into the port;

activating a pre-loaded device driver associated with the type of device inserted into the port to operate the device with the computer system.

2. The method of claim 1 wherein the step of detecting insertion of a device further comprises the step of:

starting a thread process that monitors an indication that the device has been inserted into the port.

3. The method of claim 2 wherein the step of activating a device driver further comprises the steps of:

creating a symbolic link from the device driver that is pre-loaded to and from a file system portion of the operating system;

signaling to the device driver to activate the device that has been inserted into the port to allow the device to operate with the operating system;

processing requests from the operating system for access to and from the device.

4. The method of claim 2 wherein the thread process monitors a memory location for an indication that the device has been inserted, the memory location being modified by a system management interrupt upon insertion of the device into the port.

5. The method of claim 1 wherein the step of activating a device driver further comprises the steps of:

creating a symbolic link from the device driver that is pre-loaded to and from a file system portion of the operating system;

signaling to the device driver to activate the device that has been inserted into the port to allow the device to operate with the operating system;

processing requests from the operating system for access to and from the device.

6. The method of claim 1 wherein the step of pre-loading pre-loads a Peripheral Component Interconnect type device driver for a Peripheral Component Interconnect type device and the step of detecting insertion detects insertion of a Peripheral Component Interconnect type device in the port and the step of activating activates the Peripheral Component Interconnect type device driver to operate the Peripheral Component Interconnect type device inserted into the port.

7. The method of claim 6 wherein the Peripheral Component Interconnect type device is inserted into a device port in a docking station which has been previously docked to the computer system.

8. The method of claim 7 wherein the Peripheral Component Interconnect type device driver is for a CD-ROM drive and the Peripheral Component Interconnect type device is a CD-ROM drive.

9. An activatable device driver that is pre-loaded during start-up of a computer system, the device driver associated with a device that can be inserted in a port on a bus of operational devices in the computer system subsequent to the start-up of the computer system and subsequent to the configuration of the existing devices, the device driver comprising:

a code portion including instructions executed by the computer system to access the device associated with the device driver;

an activatable portion that is activated to allow the device driver to operate in conjunction with the operating system allowing the computer system to access the device, the activatable portion being activated upon insertion of the device.

10. The device driver of claim 9, further comprising:

a symbolic link portion maintaining a symbolic link to and from a file system location within the operating system, the symbolic link allowing access by the operating system to the device, the symbolic link created in the symbolic link portion upon insertion of the device.

11. A computer system allowing insertion, configuration and operation of a device onto a bus of existing operational devices that have been previously configured for operation during start-up of the computer system, the computer system comprising:

a port on the bus capable of accepting the device;

a storage device containing an operating system for the computer system and also containing at least one device driver associated with the device to be inserted in the port;

a central processing unit loading and executing the operating system during start-up of the computer system, the operating system pre-loading, but not activating, the device driver associated with the device to be inserted in the port;

a thread process executing within the computer system detecting an insertion of the device in the port and activating the device driver for the device in response to the insertion.

12. The computer system of claim 11 wherein:

the operating system includes a file system portion; and the thread process includes a symbolic link creation process, and after the thread process detects the insertion of the device in the port, the symbolic link creation process creates a symbolic link between the device driver and file system portion of the operating system allowing the operating system to access the device after insertion.

13. The computer system of claim 12, wherein the thread process includes a signal process that signals to the device driver to operate the device inserted in the port in conjunction with the operating system after the symbolic link creation process creates the symbolic link.

14. The computer system of claim 11 wherein the device inserted in the port is a random access storage device.

15. The computer system of claim 11 wherein the device inserted is a bus controller device contained in a docking station for the computer system, the docking station including at least one bus coupled to the bus controller device and at least one port on the bus.

16. The computer system of claim 15, wherein the docking station includes at least one device inserted in the at least one port of the docking station.

17. The computer system of claim 16, wherein the at least one device inserted in the at least one port of the docking station is a random access storage device and is inserted into the at least one port of the docking station after the bus controller device in the docking station is inserted into the computer system and after a docking configuration process is complete.

18. The computer system of claim 11 further including a system management interrupt firmware processor detecting the insertion of the device in the port, initializing the device inserted in the port, and writing an indication of device insertion to a memory location monitored by the thread process.

19. The computer system of claim 11, wherein the thread process detects a removal of an inserted device in an occupied port and de-activates the device driver for the device removed in response to the removal.

20. A method for accessing a device inserted into a port of a bus in a computer system after start-up of the computer system, the method comprising the steps of:

pre-loading, during start-up of the computer system, at least one device driver for an un-inserted device for each type of device that can be inserted into the port;

the at least one device driver remaining resident, but inactive, and not linked to an operating system of the computer system until the device is inserted into the port;

detecting insertion of a device into the port after start-up of the computer system;

detecting the type of device inserted into the port; and activating a pre-loaded device driver associated with the type of device inserted into the port to operate the device with the computer system.

* * * * *